United States Patent [19]
Horn et al.

[11] Patent Number: 5,512,602
[45] Date of Patent: Apr. 30, 1996

[54] PREPARATION OF POLYURETHANE FOAMS

[75] Inventors: Peter Horn, Heidelberg; Werner Hinz, Frankenthal; Ludwig Jung, Mammendorf/Obb., all of Germany

[73] Assignee: BASF Aktiengesellschaft, Ludwigshafen, Germany

[21] Appl. No.: 212,403

[22] Filed: Mar. 11, 1994

[51] Int. Cl.$^6$ .................. C08J 9/06; C08K 5/16
[52] U.S. Cl. .............. 521/114; 521/117; 521/123; 521/128; 521/129; 528/48; 528/52; 528/53; 528/55; 528/56; 528/58; 528/59; 528/71; 528/76
[58] Field of Search .................. 521/114, 117, 521/123, 128, 129; 528/48, 52, 53, 55, 56, 58, 59, 71, 76

[56] References Cited

U.S. PATENT DOCUMENTS

| | | |
|---|---|---|
| 3,728,308 | 4/1973 | Allison et al. . |
| 5,147,898 | 9/1992 | Saito . |
| 5,306,798 | 4/1994 | Horn et al. . |

FOREIGN PATENT DOCUMENTS 2080516   4/1993   Canada .
1534236   11/1978   United Kingdom .

OTHER PUBLICATIONS

EPO Search Report dated Sep. 1, 1994; Translation of EPO Search Report.

*Primary Examiner*—James J. Seidleck
*Assistant Examiner*—Duc Truonk

[57] ABSTRACT

A process for the preparation of polyurethane foams, preferably semirigid polyurethane foams, having an improved foam structure involves reacting a) organic and/or modified organic polyisocyanates with
   b) polyhydroxyl compounds containing at least 2 reactive hydrogen atoms and
   c) crosslinking agents which comprise at least one polyoxyalkylene-polyol having a mean functionality of from 3 to 8 and a hydroxyl number of from 200 to 1300 ppm and a content of alkali metal ions of from 150 to 1200 ppm, in the presence of d) blowing agents,
   e) if desired catalysts,
   f) inorganic and/or organic acids as additives and
   g) if desired auxiliaries.

43 Claims, No Drawings

PREPARATION OF POLYURETHANE FOAMS

The present invention relates to a process for the preparation of polyurethane foams, abbreviated to PU foams below, preferably semirigid PU foams, having an improved foam structure and better flow properties of the foamable reaction mixture by reacting the starting materials known per se, polyisocyanates (a), relatively high-molecular-weight polyhydroxyl compounds (b) and crosslinking agents (c), in the presence of blowing agents (d), if desired catalysts (e), additives (f) and if desired auxiliaries (g), where the crosslinking agents (c) used according to the invention are polyoxyalkylene-polyols having a functionality of from 3 to 8, a hydroxyl number of from 200 to 1300 and a content of alkali metal ions of from 150 to 1200 ppm, and where the additives (f) are inorganic and/or organic acids.

The preparation of PU foams by reacting organic polyisocyanates with relatively high-molecular-weight polyhydroxyl compounds and, if desired, chain extenders and/or crosslinking agents in the presence of catalysts and blowing agents and, if desired, additives and auxiliaries is known and is described in numerous patents and other publications, for example Kunststoff-Handbuch, Volume VII, Polyurethane, 1st Edition, 1966, edited by Dr. R. Vieweg and Dr. A. Höchtlen, Carl Hanser Verlag, Munich.

Also known is the preparation of semirigid PU foams by the prepolymer process, usually on the basis of tolylene diisocyanate (TDI) prepolymers, and the one-shot process, advantageously using mixtures of diphenylmethane diisocyanates (MDI) and polyphenyl-polymethylene polyisocyanates, known as crude MDI, as the polyisocyanates. A specific choice of relatively high-molecular-weight polyhydroxyl compounds and chain extenders and/or crosslinking agents and various amounts of polyisocyanates and water allows semirigid PU foams having various mechanical properties to be prepared by these processes. Semirigid PU foams can furthermore be prepared without the use of water by the frothing method with addition of dichlorodifluoromethane as blowing agent. The polyhydroxyl compounds used here comprise a combination of branched, relatively high-molecular-weight polyoxyalkylene-polyols and amine-initiated chain extenders having hydroxyl numbers in the range from 450 to 500. The polyaddition reaction can be activated by organotin compounds (Kunstoff-Handbuch, Volume VII, Polyurethane, 2nd Edition, 1983, edited by D. G. Oertel, Carl Hanser Verlag, Munich, Vienna).

EP-A-0 490 145 describes composite elements comprising at least one top layer of polyvinyl chloride or a polyvinyl chloride-containing polymer mixture and a PU foam, preferably a semirigid or rigid PU foam.

PU foams are expediently prepared with addition of tertiary amines as catalysts, since these accelerate both the reaction between the hydroxyl groups of the polyhydroxyl compounds and the NCO groups of the polyisocyanates, the formation of urethane, and the reaction between water and NCO groups with formation of amino groups and carbon dioxide as blowing gas, the blowing reaction; in particular in the one-shot process, the rates of the simultaneous reactions must be balanced precisely with one another. Since, in addition to the polyaddition and blowing reaction in the formation of foam, crosslinking reactions can also take place with formation of allophanate, urea, biuret and cyanurate structures, the catalysts employed must ensure that these different reactions proceed synchronously. The catalysts must neither lose their catalytic activity due to premature incorporation into the polyurethane skeleton nor accelerate hydrolytic decomposition of the resultant PU foam.

A disadvantage is the unpleasant odor of many tertiary amines used as catalyst in industry. This can still be present in the PU foam products and have an adverse effect on their use for certain applications. According to DE-A-23 21 884 (GB-A-1,344,038), polyetherpolyols prepared with a tertiary amine as catalyst are therefore used in combination with an acid and a silicone oil for the preparation of PU foams.

It is an object of the present invention to ensure that the various reactions in the preparation of PU foams, preferably semirigid PU foams, proceed synchronously while odor nuisance is avoided in the foaming process and as a result of the resultant foam. It is a further object to reduce the tendency toward void formation in the PU foam and thus drastically to reduce the reject rate in the foam backing of dashboards and other composite elements, for example those having top layers of polyvinyl chloride or other vinyl chloride-containing polymer mixtures. Through the improvement in the PU foam structure, the mechanical properties should be improved and made uniform over the entire PU molding. A further object is to improve the flow behavior of the foamable reaction mixture and to extend the processing range with respect to the foaming equipment and conditions, for example the temperature conditions.

We have found that, surprisingly, this object is achieved by using a selected crosslinking agent which has a high alkali metal ion content and exhibits its full activity, in particular, in compounds with acids as additives.

The present invention accordingly provides a process for the preparation of PU foams, preferably semirigid PU foams, by reacting a) organic polyisocyanates with b) polyhydroxyl compounds containing at least 2 reactive hydrogen atoms and c) crosslinking agents, in the presence of d) blowing agents, e) if desired catalysts, f) additives and g) if desired auxiliaries, wherein the crosslinking agents (c) are at least one polyoxyalkylene-polyol having a functionality of from 3 to 8, a hydroxyl number of from 200 to 1300 and a content of alkali metal ions of from 150 to 1200 ppm, and the additive (f) is an inorganic and/or organic acid.

In a preferred embodiment, the crosslinking agents (c) and additives (f) which can be used according to the invention are in particular combined with the specific polyhydroxyl compounds (b1) mentioned in claim 2 or 3 and/or (b2) mentioned in claim 4.

These novel combinations of polyhydroxyl compounds (b1) and/or (b2), crosslinking agents (c) and additives (f) form, with organic polyisocyanates in the presence of blowing agents and, if desired, catalysts based on alkali metal salts of mono- and/or dicarboxylic acids and/or organometallic compounds, virtually odorless foamable reaction mixtures which have very good flow properties. The resultant PU foams are essentially odorless, exhibit a uniform, essentially void-free cell structure and have a uniformly high mechanical property level.

The following details apply to the process according to the invention for the preparation of PU foams, preferably semirigid PU foams, and to the starting materials which can be used for this purpose:

a) Suitable for the preparation of the PU foams, preferably semirigid PU foams, are organic, for example aliphatic, cycloaliphatic and preferably aromatic, diisocyanates and/or polyisocyanates (a) which are known per se. Specific examples of aromatic polyisocyanates which may be mentioned are: mixtures of 4,4'- and 2,4'-diphenylmethane diisocyanate (MDI), mixtures of MDI and polyphenyl-polymethylene polyisocyanates (crude MDI) having a content of MDI isomers of expediently at least 35% by weight, preferably from 50 to 90% by weight or more, based on the total weight of the mixture, 2,4- and 2,6-tolylene diisocyanate (TDI) and the corresponding commercially available isomer mixtures, mixtures of TDI and MDI and/or crude MDI, for example those having an MDI content of from 30 to 90% by weight, preferably from 40 to 80% by weight, based on the total weight of the crude MDI.

Suitable organic polyisocyanates (a) are also modified organic polyisocyanates, i.e. products obtained by chemical reaction of organic diisocyanates and/or polyisocyanates. Examples which may be mentioned are diisocyanates and/or polyisocyanates containing ester, urea, biuret, allophanate, isocyanurate and preferably carbodiimide, uretoneimine and/or urethane groups. Specific examples of suitable compounds are: urethane group-containing prepolymers having an NCO content of from 14 to 2.8% by weight, preferably from 12 to 3.5% by weight, or quasiprepolymers having an NCO content of from 35 to 14% by weight, preferably from 34 to 22% by weight, where urethane group-modified polyisocyanates made from TDI have, in particular, an NCO content of from 34 to 28% by weight and those made from 4,4'-MDI, 4,4'- and 2,4'-MDI isomer mixtures or crude MDI have, in particular, an NCO content of from 28 to 22% by weight, based on the total weight, and are prepared by reacting diols, oxyalkylene glycols and/or polyoxyalkylene glycols having molecular weights of from 62 to 6,000, preferably from 134 to 4,200, with TDI, 4,4'-MDI, MDI isomer mixtures and/or crude MDI, for example at from 20° to 110° C., preferably at from 50° to 90° C., specific examples of oxyalkylene and polyoxyalkylene glycols, which can be employed individually or as a mixture, being: diethylene, dipropylene, polyoxyethylene, polyoxypropylene and polyoxypropylene-polyoxyethylene glycols, and polyisocyanates containing carbodiimide groups and/or isocyanurate groups, for example based on MDI isomers and/or TDI.

However, mixtures of 4,4'- and 2,4'-MDI, crude MDI containing at least 35% by weight of MDI, based on the total weight, mixtures of 4,4'- and 2,4'-MDI and mixtures of 2,4- and 2,6-TDI, mixtures of crude MDI and mixtures of 2,4- and 2,6-TDI, urethane group-containing polyisocyanate mixtures having an NCO content of from 28 to 14% by weight, based on the total weight, based on MDI and/or crude MDI have proven particularly successful and are therefore preferably used.

b) The polyhydroxyl compounds (b) containing at least 2 reactive hydrogen atoms are expediently relatively high-molecular-weight polyhydroxyl compounds having a functionality of from 2 to 6, preferably from 2 to 4, in particular from 2 to 3, a hydroxyl number of from 14 to 200, preferably from 14 to 160, in particular from 14 to 65, and an alkali metal ion content of less than 10 ppm, preferably less than 5 ppm, in particular less than 3 ppm. Examples of relatively high-molecular-weight polyhydroxyl compounds which have proven successful are polyoxyalkylene-polyols, polyester-polyols, advantageously those prepared from alkanedicarboxylic acids and polyhydric alcohols, polythioetherpolyols, polyesteramides, hydroxyl-containing polyacetals, hydroxyl-containing, preferably aliphatic polycarbonates, or mixtures of at least two of said polyhydroxyl compounds.

Preference is given to polyester-polyols and/or in particular polyoxyalkylene-polyols.

Suitable polyoxyalkylene-polyols can be prepared from one or more alkylene oxides having 2 to 4 carbon atoms in the alkylene radical by known processes, for example by anionic polymerization using alkali metal hydroxides, such as sodium hydroxide or potassium hydroxide, or alkali metal alkoxides, such as sodium methoxide, sodium ethoxide, potassium ethoxide or potassium isopropoxide, as catalysts with addition of at least one initiator molecule containing 3 to 6 bonded reactive hydrogen atoms, or by cationic polymerization using Lewis acids, such as antimony pentachloride, boron fluoride etherate, inter alia, or bleaching earth as catalysts.

Examples of suitable alkylene oxides are tetrahydrofuran, 1,3-propylene oxide, 1,2- and 2,3-butylene oxide, styrene oxide and preferably ethylene oxide and 1,2-propylene oxide. The alkylene oxides can be used individually, alternately one after the other or as mixtures. Examples of suitable initiator molecules are: water, organic dicarboxylic acids, such as succinic acid, adipic acid, phthalic acid and terephthalic acid, and preferably polyhydric, in particular dihydric to hexahydric alcohols or dialkylene glycols, for example ethanediol, 1,2- and 1,3-propanediol, diethylene glycol, dipropylene glycol, 1,4-butanediol, 1,6-hexanediol, glycerol, trimethylolpropane, pentaerythritol and sorbitol.

The polyoxyalkylene-polyols, preferably polyoxypropylene- and polyoxypropylene-polyoxyethylene-polyols, expediently have, for the preparation of the semirigid PU foams, a functionality of, preferably, from 2 to 4, in particular from 2 to 3, and hydroxyl numbers of, preferably, from 14 to 200, in particular from 14 to 160, and suitable polyoxytetramethylene glycols usually have a hydroxyl number of from 37 to 180.

Polyhydroxyl compounds (b) or polyoxyalkylenepolyols which have proven highly successful and are therefore particularly used are polyoxyalkylenepolyols (b1) or mixtures having a functionality of from 2 to 4, preferably from 2 to 3, and a hydroxyl number of from 14 to 160, preferably from 14 to 80, in particular from 18 to 80, which are prepared by polyaddition of ethylene oxide, 1,2-propylene oxide or mixtures of ethylene oxide whit 1,2-propylene oxide onto at least one initiator molecule of the formula

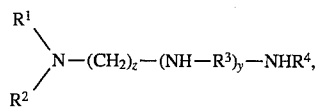

where

R$^1$ and R$^2$ are identical or different, linear or branched C$_1$- to C$_4$-alkyl, the two radicals together are C$_4$- to C$_6$-cycloalkylene, in which a methylene group may be replaced by an —O— or —NR$^5$— bridge, where R$^5$ is C$_1$- to C$_4$-alkyl, or R$^1$ and R$^2$ are identical or different dialkylaminoalkyl of the formula

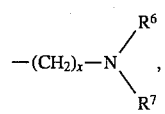

where R$^6$ and R$^7$ are identical or different, linear or branched C$_1$- to C$_4$-alkyl, or the two radicals together are C$_4$- to C$_6$-cycloalkylene, in which a methylene group may be replaced by an —O— or —NR$^5$— bridge, and x is an integer of at least 3, z is an integer of at least 3, $R^3$ is $C_2$- to $C_4$-alkylene, y is zero or a number from 1 to 3, and $R^4$ is hydrogen or $C_1$- to $C_4$-alkyl, with the proviso that $R^4$ is hydrogen if y is zero.

Particularly preferred polyoxyalkylenepolyols (b1) having a functionality of from 2 to 3 and a hydroxyl number of from 14 to 160, in particular from 18 to 80, may furthermore be prepared by polyaddition of at least one alkylene oxide, preferably ethylene oxide, 1,2-propylene oxide or mixtures of ethylene oxide and 1,2-propylene oxide, onto an initiator molecule from the group consisting of N,N-dimethyl-1,3-diaminopropane, N,N-dimethyl-1,4-diaminobutane and in particular N,N-dimethyldipropylenetriamine. Highly reactive polyoxyalkylene-polyols (b1) of this type in which the tertiary amino group is bonded via a spacer bridge comprising at least 3 methylene radicals, to the —NH— and/or —NH$_2$ groups which react with alkylene oxide, are described in DE-A-41 35 588, whose entire disclosure is to be regarded as part of the description of the invention.

Particularly preferred polyhydroxyl compounds (b) and polyoxyalkylene-polyols are furthermore block polyoxypropylene-polyoxyethylene-polyols (b2) or mixtures having a hydroxyl number of from 14 to 65, preferably from 14 to 40, in particular from 20 to 35, and a content of terminal ethylene oxide units of from 2 to 9% by weight, preferably from 3 to 8% by weight, in particular from 5 to 7% by weight, based on the weight of the polyoxypropylene units, which are prepared by anionic polymerization at elevated temperature of 1,2-propylene oxide onto an initiator molecule mixture having a mean functionality of from 2.3 to 2.8, preferably from 2.3 to 2.7, in particular from 2.5 to 2.7, which comprises water and glycerol and/or trimethylolpropane, and polymerization of ethylene oxide onto the resultant polyoxypropylene adduct. Block polyoxypropylenepolyoxyethylene-polyols (b2) of said type are disclosed in EP-A-433 878 and EP-A-433 889, whose entire descriptions are to be regarded as part of the description of the invention.

Other suitable polyoxyalkylene-polyols are polymer-modified polyoxyalkylene-polyols (b3), preferably graft polyoxyalkylene-polyols, in particular those based on styrene and/or acrylonitrile and prepared by in-situ polymerization of acrylonitrile, styrene or preferably mixtures of styrene and acrylonitrile, for example in a weight ratio of from 90:10 to 10:90, preferably from 70:30 to 30:70, expediently in the abovementioned polyoxyalkylene-polyols, by a method similar to that described in German Patents 11 11 934, 12 22 669 (US 3,304,273, 3,383,351 and 3,523,093), 11 52 536 (GB1,040,452) and 11 52 537 (GB987 618), and polyoxyalkylene-polyol dispersions which contain, as the disperse phase, usually in an amount of from 1 to 50% by weight, preferably from 2 to 25% by weight, for example polyureas, polyhydrazides, tert.-amino-containing polyurethanes and/or melamine, and are described, for example, in EP-B-011 752 (U.S. Pat. No. 4,304,708), U.S. Pat. No. 4,374,209 and DE-A-32 31 497.

The polyoxyalkylene-polyols can be used individually or in the form of mixtures. Polyhydroxyl compounds which have proven highly successful are mixtures which contain the polyoxyalkylene-polyols (b1) and (b2), these expediently being present in the mixture in an amount, based on the total weight, of from 2 to 50% by weight, preferably from 8 to 48% by weight (b1) and from 10 to 50% by weight, preferably from 20 to 48% by weight (b2).

Other polyhydroxyl compounds (b) which can be used are polyester-polyols, which can be prepared, for example, from alkanedicarboxylic acids having 2 to 12 carbon atoms, preferably alkanedicarboxylic acids having 4 to 6 carbon atoms, or mixtures of alkanedicarboxylic acids and/or aromatic polycarboxylic acids and polyhydric alcohols, preferably diols, having 2 to 12 carbon atoms, preferably 2 to 6 carbon atoms, and/or alkylene glycols. Examples of suitable alkanedicarboxylic acids are: succinic acid, glutaric acid, adipic acid, suberic acid, azelaic acid, sebacic acid and decanedicarboxylic acid. Examples of suitable aromatic polycarboxylic acids are phthalic acid, isophthalic acid and terephthalic acid. The alkanedicarboxylic acids can be used either individually or as mixtures with one another. It is also possible to replace the free dicarboxylic acids by the corresponding dicarboxylic acid derivatives, for example dicarboxylic monoesters or diesters with alcohols having 1 to 4 carbon atoms or dicarboxylic anhydrides. Preference is given to dicarboxylic acid mixtures comprising succinic acid, glutaric acid and adipic acid in mixing ratios of, for example, from 20 to 35:5 to 50:20 to 32 parts by weight, in particular adipic acid. Examples of dihydric and polyhydric alcohols, in particular diols or alkylene glycols, are: ethanediol, diethylene glycol, 1,2- and 1,3-propanediol, dipropylene glycol, 1,4-butanediol, 1,5-pentanediol, 1,6-hexanediol, 1,10-decanediol, glycerol and trimethylolpropane. Preference is given to ethanediol, diethylene glycol, 1,4-butanediol, 1,5-pentanediol, 1,6-hexanediol or mixtures of at least two of said diols, in particular mixtures of 1,4-butanediol, 1,5-pentanediol and 1,6-hexanediol. It is also possible to employ polyesterpolyols made from lactones, for example ε-caprolactone, or hydroxycarboxylic acids, for example ω-hydroxycaproic acid.

To prepare the polyester-polyols, the mixtures of aromatic and aliphatic dicarboxylic acids and preferably alkanedicarboxylic acids and/or derivatives thereof and polyhydric alcohols can be polycondensed in the absence of catalysts or preferably in the presence of esterification catalysts, expediently in an inert-gas atmosphere, for example of nitrogen, helium, argon, inter alia, in the melt at from 150° to 250° C., preferably at from 180° to 220° C., at atmospheric pressure or under reduced pressure to the desired acid number, which is advantageously less than 10, preferably less than 2. In a preferred embodiment, the esterification mixture is polycondensed at the abovementioned temperatures to an acid number of from 80 to 30, preferably from 40 to 30, under atmospheric pressure and subsequently under a pressure of less than 500 mbar, preferably from 50 to 150 mbar. Examples of suitable esterifaction catalysts are ion, cadmium, cobalt, lead, zinc, antimony, magnesium, titanium and tin catalysts in the form of metals, metal oxides or metal salts. However, the polycondensation can also be carried out in the liquid phase in the presence of diluents and/or entrainers, for example benzene, toluene, xylene or chlorobenzene, for azeotropic removal of the water condensation by distillation.

To prepare the polyester-polyols, the organic polycarboxylic acids and/or derivatives thereof and polyhydric alcohols are advantageously polycondensed in a molar ratio of 1:1 to 1:8, preferably from 1:1.05 to 1.2.

The resultant polyester-polyols preferably have a functionality of from 2 to 4, in particular from 2 to 3, and a hydroxyl number of from 25 to 200, preferably from 32 to 140, in particular from 40 to 94.

Examples of suitable hydroxyl-containing polyacetals are compounds which can be prepared from glycols, such as diethylene glycol, triethylene glycol, 4,4'-dihydroxyethoxydiphenyldiphenylmethane, hexanediol and formaldehyde. Suitable polyacetals can also be prepared by polymerization of cyclic acetals.

Examples of suitable hydroxyl-containing polycarbonates are those known per se, which can be prepared, for example, by reacting diols, such as 1,3-propanediol, 1,4-butanediol and/or 1,6-hexanediol, diethylene glycol, triethylene glycol or tetraethylene glycol, with diaryl carbonates, for example diphenyl carbonate, or phosgene.

The polyester-amides include, for example, the predominantly linear condensates obtained from polybasic, saturated and/or unsaturated carboxylic acids or anhydrides thereof and polyhydric, saturated and/or unsaturated amino alcohols, or mixtures of polyhydric alcohols and amino alcohols and/or polyamines.

Other polyhydroxyl compounds (b) which can be used are mixtures of the relatively high-molecular-weight polyhydroxyl compounds mentioned by way of example and low-molecular-weight chain extenders. Examples of suitable chain extenders of this type are diols and/or triols having molecular weights of less than 400, preferably from 60 to 300, for example aliphatic, cycloaliphatic and/or araliphatic diols having 2 to 14 carbon atoms, preferably 4 to 10 carbon atoms, for example ethylene glycol, 1,3-propanediol, 1,10-decanediol, o-, m- and p-dihydroxycyclohexane, diethylene glycol, dipropylene glycol and preferably 1,4-butanediol, 1,6-hexanediol and bis(2-hydroxyethyl)hydroquinone, triols, such as 1,2,4- and 1,3,5-trihydroxycyclohexane, glycerol and trimethylolpropane. Other suitable chain extenders are low-molecular-weight, hydroxyl-containing polyalkylene oxides having molecular weights of up to 400 based on ethylene oxide and/or 1,2-propylene oxide and the diols and/or triols mentioned by way of example as initiator molecules.

If mixtures of relatively high-molecular-weight polyhydroxyl compounds and chain extenders are used, for example to modify the mechanical properties, for example the hardness, these expediently contain the chain extenders in an amount of from 0.5 to 20% by weight, preferably from 10 to 15% by weight, based on the total weight, the alkali metal ion content of the mixture being, analogously to the relatively high-molecular-weight polyhydroxyl compounds (b), less than 10 ppm, preferably less than 5 ppm, in particular less than 3 ppm.

c) While the commercially available relatively high-molecular-weight polyhydroxyl compounds and, if used, low-molecular-weight chain extenders have alkali metal contents of less than 10 ppm, it is essential for carrying out the process according to the invention that the crosslinking agents (c) have a very high alkali metal ion content compared with commercially available products. Suitable crosslinking agents (c) are thus polyoxyalkylene-polyols and mixtures thereof having a functionality of from 3 to 8, preferably from 3 to 6, in particular 3, a hydroxyl number of from 200 to 1300, preferably from 210 to 970, in particular from 350 to 750, and a content of alkali metal ions, preferably potassium ions, of from 150 to 1200 ppm, preferably from 150 to 800 ppm, in particular from 400 to 600 ppm.

The crosslinking agents (c) having an alkali metal ion content of from 150 to 1200 ppm can be the polyoxyalkylene-polyols having a hydroxyl number of from 200 to 1300 which are known per se, with the proviso that the polyoxyalkylene-polyols are prepared directly with the alkali metal ion content necessary according to the invention or preferably the alkali metal ion content of commercially available polyoxyalkylene-polyols, which is usually less than 10 ppm, is increased by a suitable method. To this end, the polyoxyalkylene-polyols can be treated with aqueous alkali metal hydroxide, preferably an aqueous potassium hydroxide solution, or alcoholic alkali metal alkoxide solutions, preferably alcoholic potassium alkoxide solutions, in the requisite amounts at room temperature or elevated temperature, for example at from 20° to 120° C. The water which has been added or formed or the alcohol is then removed by distillation at from 70° to 110° C., at atmospheric pressure or under reduced pressure, for example at 0.01 to 1 mbar.

Crosslinking agents (c) which have proven highly successful and are therefore preferably used are, for example, trimethylolpropane-initiated polyoxyethylene-polyols having a hydroxyl number in the range from 632 to 970 and a potassium ion content in the range from 400 to 600 ppm, glycerol-initiated polyoxyethylene-polyols having a hydroxyl number in the range from 379 to 1240 and a potassium ion content in the range from 400 to 800 ppm, preferably from 400 to 600 ppm, and glycerol- or trimethylolpropane- or glycerol/trimethylolpropane mixture-initiated polyoxypropylene-polyols having a hydroxyl number in the range from 210 to 480 and a potassium ion content in the range from 400 to 600 ppm. Examples of other alkali metal-rich crosslinking agents (c) are polyoxypropylene-polyols having a functionality of from 4 to 8, preferably from 4 to 6, and a hydroxyl number of from 230 to 500, preferably from 250 to 380, which are obtained using sucrose or preferably sorbitol or mixtures of sucrose and sorbitol as initiator molecules, where, as coinitiators, water, propylene glycol, glycerol or mixtures of at least two of the said coinitiators can also be used, with the proviso that the polyoxyalkylene-polyols have an alkali metal ion content, preferably a potassium ion content of from 200 to 1000 ppm, preferably from 400 to 700 ppm. Also suitable are polyoxypropylene- and/or polyoxyethylene-polyols having an alkali metal ion content of from 150 to 800 ppm and a hydroxyl number of from 450 to 750 which are obtained by reacting pentaerythritol or a mixture of pentaerythritol and glycerol and/or trimethylolpropane, expediently in a pentaerythritol:glycerol and/or trimethylolpropane molar ratio of 1:1, with 1,2-propylene oxide or ethylene oxide. Other alkali metal-rich crosslinking agents (c) which can be used are polyoxypropylene-polyoxyethlene-polyols, which are obtained, for example, by polyaddition of 1,2-propylene oxide and ethylene oxide in a molar ratio of from 1:1 to 1:8, preferably from 1:1 to 1:5, onto glycerol, trimethylolpropane or a mixture of glycerol and trimethylolpropane as initiator molecules, having a hydroxyl number of from 210 to 970, preferably from 380 to 600, and an alkali metal ion content, preferably a potassium ion content, of from 150 to 800 ppm, preferably from 400 to 600 ppm, or by polyaddition of 1,2-propylene oxide and ethylene oxide in a molar ratio of from 1:1 to 1:8, preferably from 1:1 to 1:5, onto sucrose or preferably sorbitol or mixtures of sucrose and sorbitol as initiator molecules, having a hydroxyl number of from 200 to 500, preferably from 230 to 300, and an alkali metal ion content, preferably a potassium ion content, of from 200 to 800 ppm, preferably from 400 to 600 ppm. The alkali metal-rich polyoxyalkylene-polyols mentioned by way of example as cross-linking agents (c) can be used individually or in the form of mixtures.

To prepare the PU foams by the process according to the invention, the crosslinking agents (c) are expediently used in amounts of from 0.5 to 10% by weight, preferably from 1 to 8% by weight, in particular from 2 to 5% by weight, based on the weight of the polyhydroxyl compounds (b).

d) The blowing agents (d) which can be used to prepare the PU foams, preferably semirigid PU foams, preferably include water, which reacts with isocyanate groups to form carbon dioxide. The amounts of water expediently employed are from 0.1 to 8 parts by weight, preferably from 1.5 to 5.0 parts by weight, in particular from 2.5 to 3.5 parts by weight, based on 100 parts by weight of the polyhydroxyl compounds (b) or mixtures of relatively high-molecular-weight polyhydroxyl compounds and chain extenders.

It is also possible to employ physical blowing agents, mixed with water or as the only blowing agent. Suitable are liquids which are inert toward the organic, modified or unmodified polyisocyanates (a) and have boiling points of below 100° C., preferably below 50° C., in particular from −50° C. to 30° C. at atmosphere pressure, so that they evaporate under the influence of the exothermic polyaddition reaction. Examples of preferred liquids of this type are hydrocarbons, for example n- and isopentane, preferably technical-grade mixtures of n- and isopentanes, n- and isobutane, n- and isopropane, cycloalkanes, for example cyclohexane and cyclopentane, ethers, for example furan, dimethyl ether and diethyl ether, ketones, for example acetone and methyl ethyl ketone, alkyl carboxidates, for example methyl formate, dimethyl oxalate and ethyl acetate, and halogenated hydrocarbons, for example methylene chloride, dichloromonofluoromethane, difluoromethane, difluorochloromethane, trifluoromethane, difluoroethane, tetrafluoroethane, heptafluoropropane, 1-chloro-2,2-difluoroethane (142), 1-chloro-1,1-difluoroethane (142b) and 1-chloro-1,2-difluoroethane (142a). It is also possible to use mixtures of these low-boiling liquids with one another, for example mixtures of difluorochloromethane (142b), and/or with other substituted or unsubstituted hydrocarbons.

The requisite amount, or the requisite amount in addition to water, of physical blowing agents can be determined in a simple manner as a function of the foam density desired and is from about 0 to 25 parts by weight, preferably from 1 to 25 parts by weight, in particular from 2 to 15 parts by weight, per 100 parts by weight of polyhydroxyl compounds (b). It may be expedient to mix the modified or unmodified polyisocyanates (a) with the inert physical blowing agent and thus to reduce the viscosity.

e) The PU foams can be prepared by the process according to the invention in the absence of catalysts. However, the reaction is expediently carried out in the presence of catalysts (e) which greatly accelerate the reaction of the organic and/or modified organic polyisocyanates (a) with the polyhydroxyl compounds (b) and crosslinking agents (c). Examples of suitable catalysts are alkali metal salts of monocarboxylic acids containing linear or branched alkyl radicals having 1 to 20 carbon atoms, preferably 1 to 18 carbon atoms, and/or dicarboxylic acids containing linear or branched alkyl radicals having 2 to 20 carbon atoms, preferably from 2 to 12 carbon atoms, for example potassium formate, potassium acetate, potassium octanoate, potassium maleate and bipotassium adipate, and organometallic compounds, preferably organotin compounds, for example tin(II) salts of organic carboxylic acids, for example tin(II) diacetate, tin(II) dioctanoate, tin(II) diethylhexanoate and tin(II) dilaurate, and the dialkyltin(IV) salts of organic carboxylic acids, for example dibutyltin diacetate, dibutyltin dilaurate, dibutyltin maleate and dioctyltin diacetate. Catalysts of this type are described, for example, in DE-A-3 048 529. Dialkyltin(IV) mercapto compounds, for example bis-lauryltin(IV) dimercaptide, have also proven highly suitable.

The catalysts are usually used in an amount of from 0.001 to 0.2 part by weight, preferably from 0.005 to 0.15 part by weight, per 100 parts by weight of the formative components (a) to (c).

f) For the preparation of the PU foams by the process according to the invention, the essential additive used comprises inorganic acids, organic acids or mixtures of inorganic and organic acids. Examples of inorganic acids which have proven successful are polyphosphoric acids, monobasic and polybasic phosphoric acids, preferably triphosphoric acid, and hydrochloric acid. Preference is given to organic acids, in particular those from the group consisting of monocarboxylic acids, polycarboxylic acids, preferably dicarboxylic acids, and aromatic sulfonic acids. Examples which may be mentioned of organic acids are mono- and dicarboxylic acids, e.g. formic acid, acetic acid, propionic acid and preferably ricinoleic acid, oxalic acid, succinic acid, maleic acid, fumaric acid, tartaric acid, citric acid, adipic acid, benzoic acid, phthalic acid, terephthalic acid and isophthalic acid, and sulfonic acids, e.g. benzenesulfonic acid and p-toluenesulfonic acid. The inorganic and/or organic acids are usually used in an amount of from 0.1 to 20 parts by weight, based on 100 parts by weight of polyhydroxyl compound (d), depending on their $pK_a$ value and molecular weight and on the basicity of the polyhydroxyl compounds (b), it being possible to determine the precise amounts by weight by simple preliminary experiments.

If at least one polyoxyalkylene-polyol (b1) is used as the polyhydroxyl compound (b), it has proven advantageous to introduce the additive (f) into the polyoxyalkylene-polyol (b1) in a separate reaction step and to incorporate the resultant mixture into Component A.

g) If desired, auxiliaries (g) may additionally be incorporated into the reaction mixture for the preparation of the PU foams, preferably semirigid PU foams. Examples which may be mentioned are surfactants, foam stabilizers, cell regulators, fillers, dyes, pigments, flameproofing agents, antihydrolysis agents, and fungistatic and bacteriostatic substances.

Examples of surfactants are compounds which serve to support homogenization of the starting materials and may also be suitable for regulating the cell structure. Examples which may be mentioned are emulsifiers, such as the sodium salts of castor oil sulfates or of fatty acids, and salts of fatty acids with amines, for example diethylamine oleate, diethanolamine stearate and diethanolamine ricinoleate, salts of sulfonic acids, for example alkali metal or ammonium salts of dodecylbenzene- or dinaphthylmethanedisulfonic acid and ricinoleic acid; flame stabilizers, such as siloxane-oxyalkylene copolymers and other polysiloxanes, oxyethylated alkylphenols, oxyethylated fatty alcohols, paraffin oils, castor oil and ricinoleic acid esters, turkey red oil and groundnut oil, and cell regulators, such as paraffins, fatty alcohols and dimethylpolysiloxanes. For improving the emulsification action, the cell structure and/or stabilizing the foam, oligomeric polyacrylates containing polyoxyalkylene and fluoroalkane radicals as side groups are furthermore suitable. The surfactants are usually used in amounts of from 0.01 to 5 parts by weight, based on 100 parts by weight of the polyhydroxyl compounds (b) and crosslinking agents (c).

For the purposes of the present invention, fillers, in particular reinforcing fillers, are taken to mean conventional organic and inorganic fillers and reinforcing materials which are known per se. Specific examples which may be mentioned are: inorganic fillers, such as silicate minerals, for example phyllosilicates, such as antigorite, serpentine, hornblende, amphibole, chrisotile, zeolites, and talc; metal oxides, such as kaolin, aluminum oxides, aluminum silicate, titanium oxides and iron oxides, metal salts, such as chalk, barytes and inorganic pigments, such as cadmium sulfide, zink sulfide and glass particles. Examples of suitable organic fillers are carbon black, melamine, colophony, cyclopentadienyl resins and graft polymers.

The inorganic and organic fillers can be used individually or as mixtures and are advantageously incorporated into the reaction mixture in amounts of from 0.5 to 50% by weight, preferably from 1 to 40% by weight, based on the weight of components (a) to (c).

Example of suitable flameproofing agents are tricresyl phosphate, tris(2-chloroethyl) phosphate, tris(2-chloropropyl) phosphate, tris(1,3-dichloropropyl) phosphate, tris(2,3-dibromopropyl) phosphate and tetrakis(2-ethyl) ethylene diphosphate.

In addition to the abovementioned halogen-substituted phosphates, it is also possible to use inorganic flameproofing agents, such as red phosphorus, aluminum oxide hydrate, antimony trioxide, ammonium sulfate, ammonium polyphosphate and calcium sulfate, expandable graphite, urea or cyanuric acid derivatives, e.g. melamine or melamine cyanurate, or mixtures of at least two flameproofing agents, e.g. ammonium polyphosphates and melamine and, if desired, expandable graphite and/or starch for flameproofing the PU foams prepared according to the invention. In general, it has proven expedient to use from 5 to 50 parts by weight, preferably from 5 to 25 parts by weight, of said flameproofing agents or mixtures per 100 parts by weight of components (a) to (c).

Further details on the other conventional auxiliaries mentioned above can be obtained from the specialist literature, for example from the monography by J. H. Saunders and K. C. Frisch, High Polymers, Volume XVI, Polyurethanes, Parts 1 and 2, Interscience Publishers, 1962 and 1964 respectively, or Kunststoff-Handbuch, Polyurethane, Volume VII, Carl-Hanser-Verlag, Munich, Vienna, 1st and 2nd Editions, 1966 and 1983.

To prepare the PU foams, preferably the semirigid PU foams, the organic, modified or unmodified polyisocyanates (a), the polyhydroxyl compounds (b) and crosslinking agents (c) are reacted in the presence of the blowing agents (d), if desired catalysts (e) and additives (f) and, if desired auxiliaries (g), usually at from 0° to 120° C., preferably from 50° to 100° C., in particular from 18° to 80° C., in such amounts that, per NCO group, from 0.5 to 2, preferably from 0.8 to 1.3, in particular approximately one, hydroxyl group is (are) advantageously present bonded to (b) and (c). If water is the exclusive blowing agent or a constituent of the blowing agent, it has advantageously proven expedient to set the ratio between the number of equivalents of water and the number of equivalents of NCO groups in the range from 0.5 to 5:1, preferably from 0.7 to 0.95:1, in particular from 0.75 to 0.85:1. For the preparation of PU foams containing isocyanurate groups, an NCO:OH ratio of from 2 to 25:1, preferably from 2 to 10:1, in particular from 2 to 5:1, for example, has proven successful.

The PU foams, preferably the semirigid PU foams, are expediently prepared by the one-shot process by mixing two components A and B, where the starting components (b) to (d) and (f) and, if used, (e) and (g) are usually combined to form component A, and component B comprises the organic and/or modified organic polyisocyanates (a), if desired mixed with inert, physical blowing agents. Components A and B need only be mixed vigorously before preparation of the PU foams. The reaction mixture can be foamed and allowed to cure in open or closed molds. It is furthermore possible to foam-back prefabricated covering materials to give moldings.

The process according to the invention is also particularly suitable for the production of PU molded foams. To this end, the reaction mixture is introduced at from 15° to 80° C., preferably from 30° to 65° C., into an expediently metallic, heatable mold. The mold temperature is usually from 20° to 90° C., preferably from 35° to 70° C. The reaction mixture is usually allowed to cure without application of pressure or with compaction, for example at a degree of compaction of 1.1 to 8, preferably from 2 to 6, in particular from 2.2 to 4, in the closed mold.

The PU foams prepared by the process according to the invention usually have densities of from 0.025 to 0.25 g/cm$^3$, preferably from 0.035 to 0.08 g/cm$^3$, it also being possible for molded foams, for example those having a cellular core and a compacted peripheral zone, to have densities of from 0.08 to 0.75 g/cm$^3$, preferably from 0.2 to 0.6 g/cm$^3$, depending on the degree of compaction used. The PU foams prepared by the process according to the invention, as stated above, are essentially odorless, have a uniform, essentially void-free cell structure and have a uniformly high mechanical property level.

The reaction mixtures for the preparation of PU foams are used, for example, in the vehicle sector, for example in the automobile, aircraft and shipbuilding industries, and in the refrigeration and construction industries for foam-filling and foam-backing of cavities, for example of dashboards and control panels, as an intermediate layer in sandwich elements or for foam-filling of upright and chest refrigerator housings. The PU foams are suitable as insulation materials, for example as insulating shells for pipelines or heating systems. They are furthermore used as wall paneling, housing parts, cushioning materials, armrests, headrests, sun visors, glove boxes or parcel trays and safety covers.

EXAMPLES

EXAMPLE 1

Component A: A mixture comprising 43.2 parts by weight of an N,N-dimethyldipropylene-triamine-initiated polyoxypropylene (86.5% by weight)-polyoxyethylene (13.5% by weight)-polyol having a hydroxyl number of 35, 43.8 parts by weight of a block polyoxypropylene-polyoxyethylene-polyol initiated by means of an initiator molecule mixture of glycerol and water in the weight ratio 1:0.98 and having a hydroxyl number of 30, a content of terminal ethylene oxide units of 5.9% by weight, based on the weight of the polyoxypropylene units, and containing about 70% of primary hydroxyl groups, 5.0 parts by weight of a graft polyether-polyol having a hydroxyl number of 28, prepared by free-radical in-situ polymerization of a glycerol-initiated polyoxypropylene-polyoxyethylene-polyol as graft base and a mixture of styrene and acrylonitrile in the weight ratio 12:8 to form the graft shell (Polyurax® U 26-03 from BP, Germany), 4.0 parts by weight of a glycerol-initiated polyoxyethylene-polyol having a hydroxyl number of 524 and a potassium ion content of 470 ppm, 1.6 parts by weight of ricinoleic acid, 2.0 parts by weight of water and 0.4 part by weight of a 40% strength by weight solution of potassium acetate in ethylene glycol.

Component B:

A mixture of diphenylmethane diisocyanates and polyphenyl-polymethylene polyisocyanates (crude MDI) having an NCO content of 31.3% by weight and containing, based on the total weight, 37% by weight of 4,4'-MDI and 2% by weight of 2,4'-MDI.

For foam-backing of a dashboard, a cover film of PVC/ABS was laid in a metallic mold held at from 40° to 43° C.

The foam backing was carried out using a Hennecke foaming apparatus fitted with an MQ mixing head, throttle setting 5, nozzles having a diameter of 1.3 mm for Component A and 0.8 mm for Component B, and an output rate of 223 g/sec. The shot time was 4.2 to 5.05 seconds, which corresponds to an output rate of from 920 to 1126 g.

To produce the foam backing, Component A at 33° C. and 200 bar and Component B at 30° C. and 200 bar were mixed in the weight ratio 100:45, and the reaction mixture was injected into the closed mold, where it was allowed to expand. The molding was removed after 8 minutes.

The reaction mixture had a pot life of 11 seconds and a rise time of 73 seconds. The foam had a free-foamed density of 0.069 g/cm$^3$.

Ten dashboards were foam-backed without voids by the above process. After storage at 80° C. for 1 hour, no sink marks were evident on the dashboards.

EXAMPLE 2

Component A: A mixture comprising 12.6 parts by weight of an N,N-dimethyldipropylenetriamine-initiated polyoxypropylene (95% by weight)-polyoxyethylene (5% by weight)-polyol having a hydroxyl number of 119, 30.8 parts by weight of a glycerol-initiated polyoxypropylene (86% by weight)-polyoxyethylene (14% by weight)-polyol having a hydroxyl number of 28, 43.8 parts by weight of a block polyoxypropylene-polyoxyethylene-polyol initiated by means of an initiator molecule mixture of glycerol and water in the weight ratio 1:0.98 and having a hydroxyl number of 30, a content of terminal ethylene oxide units of 5.9% by weight, based on the weight of the polyoxypropylene units, and containing about 70% of primary hydroxyl groups, 5.0 parts by weight of a graft polyether-polyol having a hydroxyl number of 28, prepared by free-radical in-situ polymerization of a glycerol-initiated polyoxypropylene-polyoxyethylenepolyol as graft base and a mixture of styrene and acrylonitrile in the weight ratio 12:8 to form the graft shell (Polyurax® U 26-03 from BP, Germany), 4.0 parts by weight of a glycerol-initiated polyoxyethylene-polyol having a hydroxyl number of 524 and a potassium ion content of 470 ppm, 1.6 parts by weight of ricinoleic acid and 2.2 parts by weight of water.

Component B: similar to Example 1.

A gray film made from a PVC/ABS polymer mixture was laid in a metallic mold held at 50° C. with the internal dimensions 20×20×4 cm in such a manner that the base of the mold was fully covered.

The mold was closed, and the foamable PU reaction mixture was introduced into the mold cavity, where it was expanded and cured.

The composite element formed was demolded after 3 minutes. After at 23° C. for 24 hours, the composite element was sawn into a number of test specimens, which were stored individually in glass bottles at 120° C. in a fan-assisted drying cabinet.

The test specimens were removed after storage at 120° C. for 300 hours and 500 hours, and the film used as cover layer was separated from the PU foam with the aid of a knife.

The tear strength and elongation at break of the film and the PU foam were measured in a DIN 53 571 tensile test.

In the measurement results shown below, the comparison values for the film employed and the uncoated PU foam after storage at 23° C. for 24 hours are given in the "hours"line.

| Film material of the cover layer made from a PVC/ABS polymer mixture, gray | | |
|---|---|---|
| Storage at 120° C. [hours] | Tear strength [N/mm$^2$] | Elongation at break [%] |
| 0 | 14.6 | 160 |
| 300 | 15.6 | 100 |
| 500 | 18 | 90 |

To prepare the PU foam, 100 parts by weight of Component A and 44.38 parts by weight of Component B were mixed vigorously at 23° C. by stirring, and 250 g of the reaction mixture were introduced into the mold, where they were expanded and cured.

In addition, the reaction mixture was expanded in an open plastic beaker, with the following foaming data being measured:

Initiation time: 23 seconds

Setting time: 87 seconds

Rise time: 118 seconds.

The free-foamed foam density was 0.067 g/cm$^3$.

The following mechanical properties were determined on the free-foamed PU foam:

| Storage of the PU foam at 120° C. [hours] | 0 | 300 | 500 |
|---|---|---|---|
| Tear strength [N/mm$^2$] | 0.25 | 0.21 | 0.20 |
| Elongation at break [%] | 54 | 34 | 28 |

EXAMPLES 3 TO 5

General preparation procedure:

Preparation of a mixture of polyoxylalkylene-polyol (1) and an additive (f)

One mole of an N,N-dimethyldipropylenetriamine-initiated polyoxypropylene (86.5% by weight)-polyoxyethylene (13.5% by weight)-polyol having a hydroxyl number of 35 was mixed with an additive (f) with stirring at was and the resultant mixture was warmed to 80° C. and stirred at this temperature for 2 hours. Any water of crystallization introduced into the mixture along with the acid was subsequently removed by distillation at 80° C. under reduced pressure.

The additive (f) used was the following acids in the amounts shown:

Mixture (I): 0.5 mol of formic acid

Mixture (II): 0.5 mol of maleic acid

Mixture (III): 0.5 mol of citric acid monohydrate

Mixture (IV): 0.25 mol of a monoalkylphosphoric ester (Korantin® LUB from BASF Aktiengesellschaft).

To prepare the PU foams, Component A used was a mixture comprising 45.0 parts by weight of mixtures (I) to (III), 43.8 parts by weight of a block polyoxypropylene-polyoxyethylene-polyol initiated by means of an initiator molecule mixture of glycerol and water in the weight ratio 1:0.98 and having a hydroxyl number of 30, a content of terminal ethylene oxide units of 5.9% by weight, based on the weight of the polyoxypropylene units, and containing about 70% of primary hydroxyl groups, 5.0 parts by weight of a graft polyether-polyol having a hydroxyl number of 28, prepared by free-radical in-situ polymerization of a glycerol-initiated polyoxypropylene-polyoxyethylenepolyol as graft base and a mixture of styrene and acrylonitrile in the weight ratio 12:8 to form the graft shell (Polyurax® U 26-03 from BP, Germany), 4.0 parts by weight of a glycerol-initiated polyoxyethylene-polyol having a hydroxyl number of 524 and a potassium ion content of 470 ppm, 1.7 parts by weight of water and 0.5 parts by weight of a 40% strength by weight aqueous potassium formate solution.

Component B: similar to example 1.

The foam backing of a gray film made from a PVC/ABS polymer mixture was carried out by a method similar to that of Example 2.

The tear strength and elongation at break were measured on the film and the free-foamed PU foam by a method similar to that of Example 2 in a DIN 53 571 tensile test.

EXAMPLE 3

The above mixture (I) was used in component A.

To prepare the PU foam, 100 parts by weight of Component A and 42.34 parts by weight of Component B were mixed vigorously at 23° C. by stirring, and 250 g of the reaction mixture were introduced into the mold, where they were expanded and cured.

Measurement results: measured on film material of the covering layer.

| Film made from a PVC/ABS polymer mixture, gray | | |
|---|---|---|
| Storage at 120° C. [hours] | Tear strength [N/mm$^2$] | Elongation at break [%] |
| 0 | 12.8 | 167 |
| 300 | 17.6 | 120 |
| 500 | 19.4 | 90 | on the free-foamed PU foam:

Initiation time: 23 seconds
Setting time: 87 seconds
Rise time: 121 seconds.
PU foam density (free-foamed) 0.075 g/cm$^3$.

| Storage of the PU foam at 120° C. [hours] | 0 | 300 | 500 |
|---|---|---|---|
| Tear strength [N/mm$^2$] | 0.22 | 0.21 | 0.22 |
| Elongation at break [%] | 64 | 36 | 34 |

EXAMPLE 4

The above mixture (II) was used in Component A.

To prepare the PU foam, 100 parts by weight of Component A and 42.31 parts by weight of Component B were mixed vigorously at 23° C. by stirring, and 250 g of the reaction mixture were introduced into the mold, where they were expanded and cured.

Measurement results: measured on film material of the covering layer:

| Film made from a PVC/ABS polymer mixture, gray | | |
|---|---|---|
| Storage at 120° C. [hours] | Tear strength [N/mm$^2$] | Elongation at break [%] |
| 0 | 12 | 162 |
| 300 | 15 | 102 |
| 500 | 18 | 80 | on the free-foamed PU foam:

Initiation time: 23 seconds
Setting time: 115 seconds
Rise time: 165 seconds.
PU foam density (free-foamed) 0.074 g/cm$^3$.

| Storage of the PU foam at 120° C. [hours] | 0 | 300 | 500 |
|---|---|---|---|
| Tear strength [N/mm$^2$] | 0.21 | 0.21 | 0.22 |
| Elongation at break [%] | 64 | 36 | 34 |

EXAMPLE 5

The above mixture (III) was used in Component A.

To prepare the PU foam, 100 parts by weight of Component A and 42.99 parts by weight of Component B were mixed vigorously at 23° C. by stirring, and 250 g of the reaction mixture were introduced into the mold, where they were expanded and cured.

Measurement results: measured on film material of the covering layer:

| Film made from a PVC/ABS polymer mixture, gray | | |
|---|---|---|
| Storage at 120° C. [hours] | Tear strength [N/mm$^2$] | Elongation at break [%] |
| 0 | 13.0 | 158 |
| 300 | 17.3 | 140 |
| 500 | 18.2 | 80 | on the free-foamed PU foam:

Initiation time: 24 seconds
Setting time: 87 seconds
Rise time: 126 seconds.
PU foam density (free-foamed) 0.0745 g/cm$^3$.

| Storage of the PU foam at 120° C. [hours] | 0 | 300 | 500 |
|---|---|---|---|
| Tear strength [N/mm$^2$] | 0.21 | 0.18 | 0.12 |
| Elongation at break [%] | 65 | 35 | 23 |

EXAMPLE 6

Component A: A mixture comprising 22.0 parts by weight of an N,N-dimethyldipropylenetriamine-initiated polyoxypropylene (86.5% by weight)-polyoxyethylene (13.5% by weight)-polyol having a hydroxyl number of 35, 22.0 parts by weight of the mixture (IV) described under Examples 3 to 5, general preparation procedure, 43.8 parts by weight of a block polyoxypropylene-polyoxyethylene-polyol initiated by means of an initiator molecule mixture of glycerol and water in the weight ratio 1:0.98 and having a hydroxyl number of 30, a content of terminal ethylene oxide units of 5.9% by weight, based on the weight of the polyoxypropylene units, and containing about 70% of primary hydroxyl groups, 5.0 parts by weight of a graft polyether-polyol having a hydroxyl number of 28, prepared by free-radical in-situ polymerization of a glycerol-initiated polyoxypropylene-polyoxyethylenepolyol as graft base and a mixture of styrene and acrylonitrile in the weight ratio 12:8 to form the graft shell (Polyurax® U 26-03 from BP, Germany), 4.0 parts by weight of a glycerol-initiated polyoxyethylene-polyol having a hydroxyl number of 524 and a potassium ion content of 470 ppm, 0.8 parts by weight of ricinoleic acid 1.4 parts by weight of water and 1.0 part by weight of a 40% strength by weight aqueous potassium formate solution.

Component B: similar to Example 1.

The foam backing of a gray film made from a PVC/ABS polymer mixture was carried out by a method similar to that of Example 2.

100 parts by weight of Component A and 42.64 parts by weight of Component B were mixed vigorously at 23° C. by stirring, and 250 g of the reaction mixture were introduced into the mold, where they were expanded and cured.

The following mechanical properties were measured on the film and the free-foamed PU foam by a method similar to that of Example 2:

Film material of the cover layer:

| Film made from a PVC/ABS polymer mixture, gray | | |
|---|---|---|
| Storage at 120° C. [hours] | Tear strength [N/mm$^2$] | Elongation at break [%] |
| 0 | 11.0 | 160 |
| 300 | 13.3 | 119 |
| 500 | 13.0 | 90 | free-foamed PU foam:

Initiation time: 25 seconds

Setting time: 95 seconds

Rise time: 142 seconds.

PU foam density (free-foamed) 0.0768 g/cm$^3$.

| Storage of the PU foam at 120° C. [hours] | 0 | 300 | 500 |
|---|---|---|---|
| Tear strength [N/mm$^2$] | 0.2 | 0.11 | 0.11 |
| Elongation at break | 159 | 119 | 100 |

We claim:

1. A process for the preparation of polyurethane foams by reacting a) organic polyisocyanates with b) polyhydroxyl compounds containing at least 2 reactive hydrogen atoms and c) crosslinking agents, in the presence of d) blowing agents, e) optionally catalysts, f) additives and g) optionally auxiliaries, wherein the crosslinking agents (c) comprise at least one polyoxyalkylene-polyol having a functionality of from 3 to 8, a hydroxyl number of from 200 to 1300 and a content of alkali metal ions of from 150 to 1200 ppm, and the additive (f) comprises an inorganic and/or organic acid.

2. A process as claimed in claim 1, wherein the polyhydroxyl compounds (b) comprise at least one polyoxyalkylene-polyol (b1) having a functionality of from 2 to 4 and a hydroxyl number of from 14 to 160 which is prepared by polyaddition of ethylene oxide, 1,2-propylene oxide or mixtures of ethylene oxide and 1,2-propylene oxide onto at least one initiator molecule of the formula

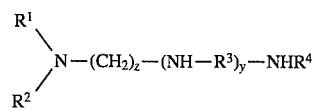

where $R^1$ and $R^2$ are identical or different, linear or branched $C_1$- to $C_4$-alkyl, the two radicals together are $C_4$- to $C_6$-cycloalkylene, in which a methylene group may be replaced by an —O— or —NR$^5$— bridge, where $R^5$ is $C_1$- to $C_4$-alkyl, or $R^1$ and $R^2$ are identical or different dialkylaminoalkyl of the formula

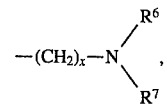

where $R^6$ and $R^7$ are identical or different, linear or branched $C_1$- to $C_4$-alkyl, or the two radicals together are $C_4$- to $C_6$-cycloalkylene, in which a methylene group may be replaced by an —O— or —NR$^5$— bridge, and x is an integer of at least 3, z is an integer of at least 3, $R^3$ is $C_2$- to $C_4$-alkylene, y is zero or a number from 1 to 3, and $R^4$ is hydrogen or $C_1$- to $C_4$-alkyl, with the proviso that $R^4$ is hydrogen if y is zero.

3. A process as claimed in claim 1, wherein the polyhydroxyl compounds (b) comprise at least one polyoxyalkylene-polyol (b1) having a functionality of from 2 to 3 and a hydroxyl number of from 14 to 160 which is prepared by polyaddition of at least one alkylene oxide onto an initiator molecule selected from the group consisting of N,N-dimethyl-1,3-diaminopropane, N,N-dimethyl-1,4-diaminobutane and N,N-dimethyldipropylenetriamine.

4. A process as claimed in claim 1, wherein the polyhydroxyl compounds (b) comprise at least one block polyoxypropylene-polyoxyethylene-polyol (b2) having a hydroxyl number of from 14 to 65 and a content of terminal ethylene oxide units of from 2 to 9% by weight, based on the weight of the polyoxypropylene units, which is prepared by anionic polyaddition at elevated temperature of 1,2-propylene oxide onto an initiator molecule mixture having a functionality of from 2.3 to 2.8 comprising water and glycerol and/or trimethylolpropane, and polyaddition of ethylene oxide onto the resultant polyoxypropylene adduct.

5. A process as claimed in claim 1, wherein the polyhydroxyl compounds (b) are a mixture containing (b1) and (b2).

6. A process as claimed in claim 1, wherein the polyhydroxyl compounds (b) are a mixture containing, based on the total weight, from 2 to 50% by weight of (b1) and from 10 to 50% by weight of (b2).

7. A process as claimed in claim 1, wherein the crosslinking agent (c) comprises at least one glycerol- and/or trimethylolpropane-initiated polyoxypropylene-, polyoxyethylene- or polyoxypropylenepolyoxyethylene-polyol having a hydroxyl number in the range from 210 to 970 and an alkali metal ion content of from 150 to 800 ppm.

8. A process as claimed in claim 1, wherein the inorganic acids used as additive (f) are selected from the group consisting of hydrochloric acid and phosphoric acids, and the organic acids are selected from the group consisting of monocarboxylic acids, polycarboxylic acids and aromatic sulfonic acids.

9. A process as claimed in claim 1, wherein the additive (f) is ricinoleic acid.

10. A process as claimed in claim 1, wherein the blowing agent (d) is water.

11. A process as claimed in claim 2, wherein the crosslinking agent (c) comprises at least one glycerol- and/or trimethylolpropane-initiated polyoxypropylene-, polyoxyethylene- or polyoxypropylene-polyoxyethylene-polyol having a hydroxyl number in the range from 210 to 970 and an alkali metal ion content of from 150 to 800 ppm.

12. A process as claimed in claim 2, wherein the inorganic acids used as additive (f) are selected from the group consisting of hydrochloric acid and phosphoric acids, and the organic acids are selected from the group consisting of monocarboxylic acids, polycarboxylic acids and aromatic sulfonic acids.

13. A process as claimed in claim 2, wherein the additive (f) is ricinoleic acid.

14. A process as claimed in claim 2, wherein the blowing agent (d) is water.

15. A process as claimed in claim 3, wherein the crosslinking agent (c) comprises at least one glycerol- and/or trimethylolpropane-initiated polyoxypropylene-, polyoxyethylene- or polyoxypropylene-polyoxyethylene-polyol having a hydroxyl number in the range from 210 to 970 and an alkali metal ion content of from 150 to 800 ppm.

16. A process as claimed in claim 3, wherein the inorganic acids used as additive (f) are selected from the group consisting of hydrochloric acid and phosphoric acids, and the organic acids are selected from the group consisting of monocarboxylic acids, polycarboxylic acids and aromatic sulfonic acids.

17. A process as claimed in claim 3, wherein the additive (f) is ricinoleic acid.

18. A process as claimed in claim 3, wherein the blowing agent (d) is water.

19. A process as claimed in claim 4, wherein the polyhydroxyl compounds (b) are a mixture containing (b1) and (b2).

20. A process as claimed in claim 4, wherein the polyhydroxyl compounds (b) are a mixture containing, based on the total weight, from 2 to 50% by weight of (b1) and from 10 to 50% by weight of (b2).

21. A process as claimed in claim 4, wherein the crosslinking agent (c) comprises at least one glycerol- and/or trimethylolpropane-initiated polyoxypropylene-, polyoxyethylene- or polyoxypropylene-polyoxyethylene-polyol having a hydroxyl number in the range from 210 to 970 and an alkali metal ion content of from 150 to 800 ppm.

22. A process as claimed in claim 4, wherein the inorganic acids used as additive (f) are selected from the group consisting of hydrochloric acid and phosphoric acids, and the organic acids are selected from the group consisting of monocarboxylic acids, polycarboxylic acids and aromatic sulfonic acids.

23. A process as claimed in claim 4, wherein the additive (f) is ricinoleic acid.

24. A process as claimed in claim 4, wherein the blowing agent (d) is water.

25. A polyurethane foam obtained by reacting a) organic polyisocyanates with b) polyhydroxyl compounds containing at least 2 reactive hydrogen atoms and c) crosslinking agents, in the presence of d) blowing agents, e) optionally catalysts, f) additives and, g) optionally auxiliaries, wherein the crosslinking agents (c) comprise at least one polyoxyalkylene-polyol having a functionality of from 3 to 8, a hydroxyl number of from 200 to 1300 and a content of alkali metal ions of from 150 to 1200 ppm, and the additive (f) comprises an inorganic and/or organic acid.

26. The polyurethane foam of claim 25, wherein the polyhydroxyl compounds (b) comprise at least one polyoxyalkylene-polyol (b1) having a functionality of from 2 to 4 and a hydroxyl number of from 14 to 160 which is prepared by polyaddition of ethylene oxide, 1,2-propylene oxide or mixtures of ethylene oxide and 1,2-propylene oxide onto at least one initiator molecule of the formula

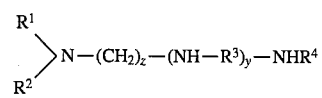

where $R^1$ and $R^2$ are identical or different, linear or branched $C_1$- to $C_4$- alkyl, the two radicals together are $C_4$- to $C_6$-cycloalkylene, in which a methylene group may be replaced on an —O— or —$NR^5$— bridge, where $R^5$ is $C_1$- to $C_4$-alkyl, or $R^1$ and $R^2$ are identical or different dialkylaminoalkyl of the formula

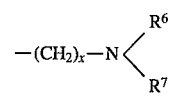

where $R^6$ and $R^7$ are identical or different, linear or branched $C_1$- to $C_4$-alkyl, or the two radicals together are $C_4$- to $C_6$-cycloalkylene, in which a methylene group may be replaced by an —O— or —$NR^5$— bridge, and x is an integer or at least 3, z is an integer of at least 3, $R^3$ is $C_2$- to $C_4$-alkylene, y is zero or a number from 1 to 3, and $R^4$ is hydrogen or $C_1$- to $C_4$-alkyl, with the proviso that $R^4$ is hydrogen if y is zero.

27. The polyurethane foam of claim 26, wherein the crosslinking agent (c) comprises at least one glycerol- and/or trimethylolpropane-initiated polyoxypropylene-, polyoxyethylene- or polyoxypropylene-polyoxyethylene-polyol having a hydroxyl number in the range from 210 to 970 and an alkali metal ion content of from 150 to 800 ppm.

28. The polyurethane foam of claim 26, wherein the inorganic acids used as additive (f) are selected from the group consisting of hydrochloric acid and phosphoric acids, and the organic acids are selected from the group consisting of monocarboxylic acids, polycarboxylic acids and aromatic sulfonic acids.

29. The polyurethane foam of claim 28, wherein the additive (f) is ricinoleic acid.

30. The polyurethane foam of claim 26, wherein the blowing agent (d) is water.

31. The polyurethane foam of claim 25, wherein the polyhydroxyl compounds (b) are at least one polyoxyalkylene-polyol (b1) having a functionality of from 2 to 3 and a hydroxyl number of from 14 to 160 which is prepared by polyaddition of at least one alkylene oxide onto an initiator molecule selected from the group consisting of N,N-dimethyl-1,3-diaminopropane, N,N-dimethyl-1,4-diaminobutane and N,N-dimethyldipropylenetriamine.

32. The polyurethane foam of claim 31, wherein the crosslinking agent (c) comprises at least one glycerol- and/or trimethylolpropane-initiated polyoxypropylene-, polyoxyethylene- or polyoxypropylene-polyoxyethylene-polyol having a hydroxyl number in the range from 210 to 970 and an alkali metal ion content of from 150 to 800 ppm.

33. The polyurethane foam of claim 31, wherein the inorganic acids used as additive (f) are selected from the group consisting of hydrochloric acid and phosphoric acids, and the organic acids are selected from the group consisting of monocarboxylic acids, polycarboxylic acids and aromatic sulfonic acids.

34. The polyurethane foam of claim 33, wherein the additive (f) is ricinoleic acid.

35. The polyurethane foam of claim 31, wherein the blowing agent (d) is water.

36. The polyurethane foam of claim 25, wherein the polyhydroxyl compounds (b) are at least one block polyoxypropylene-polyoxyethylene-polyol (b2) having a hydroxyl number of from 14 to 65 and a content of terminal ethylene oxide units of from 2 to 9% by weight, based on the weight of the polyoxypropylene units, which is prepared by anionic polyaddition at elevated temperature of 1,2-propylene oxide onto an initiator molecule mixture having a functionality of from 2.3 to 2.8 comprising water and glycerol and/or trimethylolpropane, and polyaddition of ethylene oxide onto the resultant polyoxypropylene adduct.

37. The polyurethane foam of claim 36, wherein the polyhydroxyl compounds (b) are a mixture containing (b1) and (b 2).

38. The polyurethane foam of claim 37, wherein the polyhydroxyl compounds (b) are a mixture containing, based on the total weight, from 2 to 50% by weight of (b1) and from 10 to 50% by weight of (b2).

39. The polyurethane foam of 36, wherein the crosslinking agent (c) comprises at least one glycerol- and/or trimethylolpropane-initiated polyoxypropylene-, polyoxyethylene- or polyoxypropylene-polyoxyethylene-polyol having a hydroxyl number in the range from 210 to 970 and an alkali metal ion content of from 150 to 800 ppm.

40. The polyurethane foam of claim 36, wherein the inorganic acids used as additive (f) are selected from the group consisting of hydrochloric acid and phosphoric acids, and the organic acids are selected from the group consisting of monocarboxylic acids, polycarboxylic acids and aromatic sulfonic acids.

41. The polyurethane foam of claim 40, wherein the additive (f) is ricinoleic acid.

42. The polyurethane foam of claim 36, wherein the blowing agent (d) is water.

43. The polyurethane foam of claim 25, wherein the blowing agent (d) is water.

* * * * *